United States Patent
Banville et al.

(10) Patent No.: US 11,932,411 B2
(45) Date of Patent: Mar. 19, 2024

(54) AIRCRAFT ENGINE OIL FILLER APPARATUS

(71) Applicant: PRATT & WHITNEY CANADA CORP., Longueuil (CA)

(72) Inventors: Rose-Elizabeth Banville, Longueuil (CA); Simon Cartier, St-Bruno de Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/828,414

(22) Filed: May 31, 2022

(65) Prior Publication Data
US 2023/0399119 A1   Dec. 14, 2023

(51) Int. Cl.
*B67D 7/36* (2010.01)
*B64D 37/16* (2006.01)

(52) U.S. Cl.
CPC ............. *B64D 37/16* (2013.01); *B67D 7/365* (2013.01)

(58) Field of Classification Search
CPC ................................ B64D 37/16; B67D 7/365
See application file for complete search history.

(56) References Cited

U.S. PATENT DOCUMENTS

| | | | |
|---|---|---|---|
| 4,299,307 A | 11/1981 | Scott | |
| 4,337,657 A | 7/1982 | Morris | |
| 4,386,337 A | 5/1983 | Todd | |
| 4,480,718 A | 11/1984 | Marinelli | |
| 4,572,097 A | 2/1986 | Lansinger et al. | |
| 4,819,484 A | 4/1989 | White | |
| 4,910,495 A | 3/1990 | Sullivan | |
| 4,989,560 A | 2/1991 | Rasdal et al. | |
| 5,141,019 A | 8/1992 | LeBlanc et al. | |
| 5,299,456 A | 4/1994 | Steiner | |
| 5,327,997 A | 7/1994 | Nash, Jr. et al. | |
| 5,787,942 A | 8/1998 | Preston et al. | |
| 5,950,692 A | 9/1999 | Georgs et al. | |
| 6,564,822 B2 | 5/2003 | Muto et al. | |
| 6,926,121 B2 | 8/2005 | Gates et al. | |
| 7,089,974 B2 | 8/2006 | Stuart | |
| 7,486,179 B2 | 2/2009 | McCormick et al. | |
| 7,509,753 B2 | 3/2009 | Nicosia et al. | |

(Continued)

FOREIGN PATENT DOCUMENTS

| CA | 1214697 | 12/1986 |
|---|---|---|
| CA | 3082169 | 1/2021 |

(Continued)

*Primary Examiner* — Paul J Gray
(74) *Attorney, Agent, or Firm* — NORTON ROSE FULBRIGHT CANADA LLP (57) ABSTRACT

An aircraft engine oil filler apparatus includes a filler tube configured to be connected to an oil tank such that a bottom portion of the filler tube is disposed inside the oil tank, a valve received in the bottom portion of the filler tube movable between an open position in which the valve hydraulically connects the filler tube to the oil tank, and a closed position in which the valve hydraulically disconnects the filler tube from the oil tank, and a float disposed above the valve and operatively connected to the valve to move the valve from the open position to the closed position when oil inside the oil tank rises to a threshold level. The valve is movable independently from the float when pressure in the oil tank is greater than pressure in the filler tube. A method of operation of an oil filler apparatus is also described.

10 Claims, 11 Drawing Sheets

(56) References Cited

U.S. PATENT DOCUMENTS

| | | |
|---|---|---|
| 8,376,088 B2 | 2/2013 | Rollins et al. |
| 8,464,764 B1 | 6/2013 | Milsom |
| 9,561,949 B2 | 2/2017 | Cazaux et al. |
| 9,587,533 B2 | 3/2017 | Noguchi |
| 10,975,740 B2 | 4/2021 | Daniel et al. |
| 2003/0188576 A1 | 10/2003 | Park |
| 2009/0101230 A1 | 4/2009 | Anstead et al. |
| 2010/0179747 A1 | 7/2010 | McCormick et al. |
| 2012/0097482 A1 | 4/2012 | Miller et al. |
| 2022/0402747 A1 | 12/2022 | Brown et al. |

FOREIGN PATENT DOCUMENTS

| | | |
|---|---|---|
| CA | 3106775 | 7/2021 |
| DE | 2420019 | 11/1975 |
| DE | 2552769 | 5/1977 |
| DE | 4105529 | 8/1992 |
| DE | 4117400 | 12/1993 |
| DE | 102004029264 | 1/2006 |
| DE | 102014111323 | 4/2015 |
| FR | 2633007 | 12/1989 |
| FR | 2691251 | 11/1993 |
| GB | 955031 | 4/1964 |
| WO | 03035539 | 5/2003 |

FIG-1A

AIRCRAFT ENGINE OIL FILLER APPARATUS

TECHNICAL FIELD

The application relates to aircraft engine oil filler apparatuses.

BACKGROUND OF THE ART

A common design of prior art aircraft engine oil tanks puts the filler neck at such a level that if someone tries to overfill the oil tank, oil spills through the filler neck. Another typical prior art aircraft engine oil tank includes a valve at a filler tube inlet, which valve floats in oil to close the inlet when the oil level is high enough. However, in such prior art oil tanks the float obstructs the filler tube inlet and render problematic the use of a dipstick as mechanical oil level indicator. Therefore, while prior art oil tanks are suitable for their intended purposes, improvements can be made.

SUMMARY

In one aspect, there is provided an aircraft engine oil filler apparatus including a filler tube configured to be received through a wall of an oil tank of an aircraft engine such that an open upper end of the filler tube is accessible from outside of the oil tank and a bottom end of the filler tube is disposed inside the oil tank, a valve received at least in part in the bottom end of the filler tube and movable between an open position in which the valve hydraulically connects the filler tube to the oil tank, and a closed position in which the valve hydraulically disconnects the filler tube from the oil tank, and a float disposed above the valve and operatively connected to the valve to move the valve from the open position to the closed position when oil inside the oil tank rises to a threshold oil level defined by the closed position of the valve, the valve being further movable independently from the float from the open position to the closed position when pressure in the oil tank is greater than pressure in the filler tube and when oil inside the oil tanks is lower than the threshold oil level.

In some embodiments, the aircraft engine oil filler apparatus further includes a link connecting the float to the valve.

In some embodiments, the valve includes a piston translationally received in the filler tube, the piston being supported by the link to translate relative to the filler tube with the float.

In some embodiments, the filler tube defines an aperture in the filler tube below the float, and the piston includes a head disposed below the aperture when the valve is in the open position.

In some embodiments, the aircraft engine oil filler apparatus further includes a seat disposed inside the filler tube above the aperture, and the head of the piston is received in the seat and thereby blocks the filler tube above the aperture when the valve is in the closed position.

In some embodiments, the aircraft engine oil filler apparatus further includes a stopper provided on the link, and wherein the piston includes a flange abutting the stopper when the valve is in the open position.

In some embodiments, the flange of the piston remains spaced from the filler tube when the valve is in the closed position.

In accordance with another aspect, there is provided an oil tank of an aircraft engine including a filler tube received through a wall of the oil tank such that an upper end of the filler tube is accessible from outside of the oil tank and a bottom portion of the filler tube is disposed inside the oil tank, the filler tube defining apertures in the bottom portion, a valve received at least in part in the bottom portion of the filler tube, the valve being operable between an open position in which the valve hydraulically connects a portion of the filler tube above the apertures to the inside of the oil tank, and a closed position in which the valve blocks the filler tube above the apertures and thereby hydraulically disconnects the portion of the filler tube above the apertures from the inside of the oil tank, and a float disposed inside the oil tank above the valve and operatively connected to the valve to move the valve from the open position to the closed position when oil inside the oil tank rises to a threshold oil level defined by the closed position of the valve, the valve being further movable independently from the float from the open position to the closed position when pressure in the oil tank is greater than pressure in the filler tube and when oil inside the oil tanks is lower than the threshold oil level.

In some embodiments, the valve includes a piston having a head, the head of the piston is at least partially disposed below the apertures when the valve is in the open position and above the apertures when the valve in the closed position.

In some embodiments, the oil tank further includes a dipstick removably received in the filler tube such that a bottom end of the dipstick is above the piston both when the valve is in the open position and when the valve is in the closed position.

In accordance with yet another aspect, there is provided a method of operation of an oil filler apparatus, including receiving oil into a filler tube of the oil filler apparatus inserted at least in part into an oil tank of an aircraft, defining a fluid connection between a bottom portion of the filler tube and the oil tank for oil to flow through the filler tube to the oil tank, maintaining oil in the filler tube when the oil in the oil tank is above the bottom portion of the filler tube, and fluidly disconnecting the bottom portion of the filler tube from the oil tank when pressure in the oil tank is greater than pressure in the filler tube, or when the oil in the oil tank reaches a threshold level that is above the bottom portion of the filler tube.

In some embodiments, the fluidly disconnecting the bottom portion of the filler tube from the oil tank includes seating a piston against the filler tube.

In some embodiments, the oil filler apparatus further includes a float, and the seating the piston includes translating the piston independently from the float.

In some embodiments, the seating the piston includes blocking an inner diameter of the filler tube.

In some embodiments, the seating the piston includes telescoping the piston relative to the filler tube.

In some embodiments, the telescoping the piston includes translating the piston in the bottom portion of the filler tube.

In some embodiments, the telescoping the piston includes applying a buoyancy force to the piston to push the piston upward.

In some embodiments, the method further includes receiving a dipstick in the filler tube after the receiving oil into the filler tube but before the fluidly disconnecting the bottom portion of the filler tube from the oil tank.

In some embodiments, the receiving the dipstick occurs after fluidly disconnecting the bottom portion of the filler tube from the oil tank.

In some embodiments, the method further includes receiving a cap on the filler tube and wherein the receiving the cap includes receiving the dipstick in the filler tube.

DESCRIPTION OF THE DRAWINGS

Reference is now made to the accompanying figures in which.

DETAILED DESCRIPTION

Figure 1A:
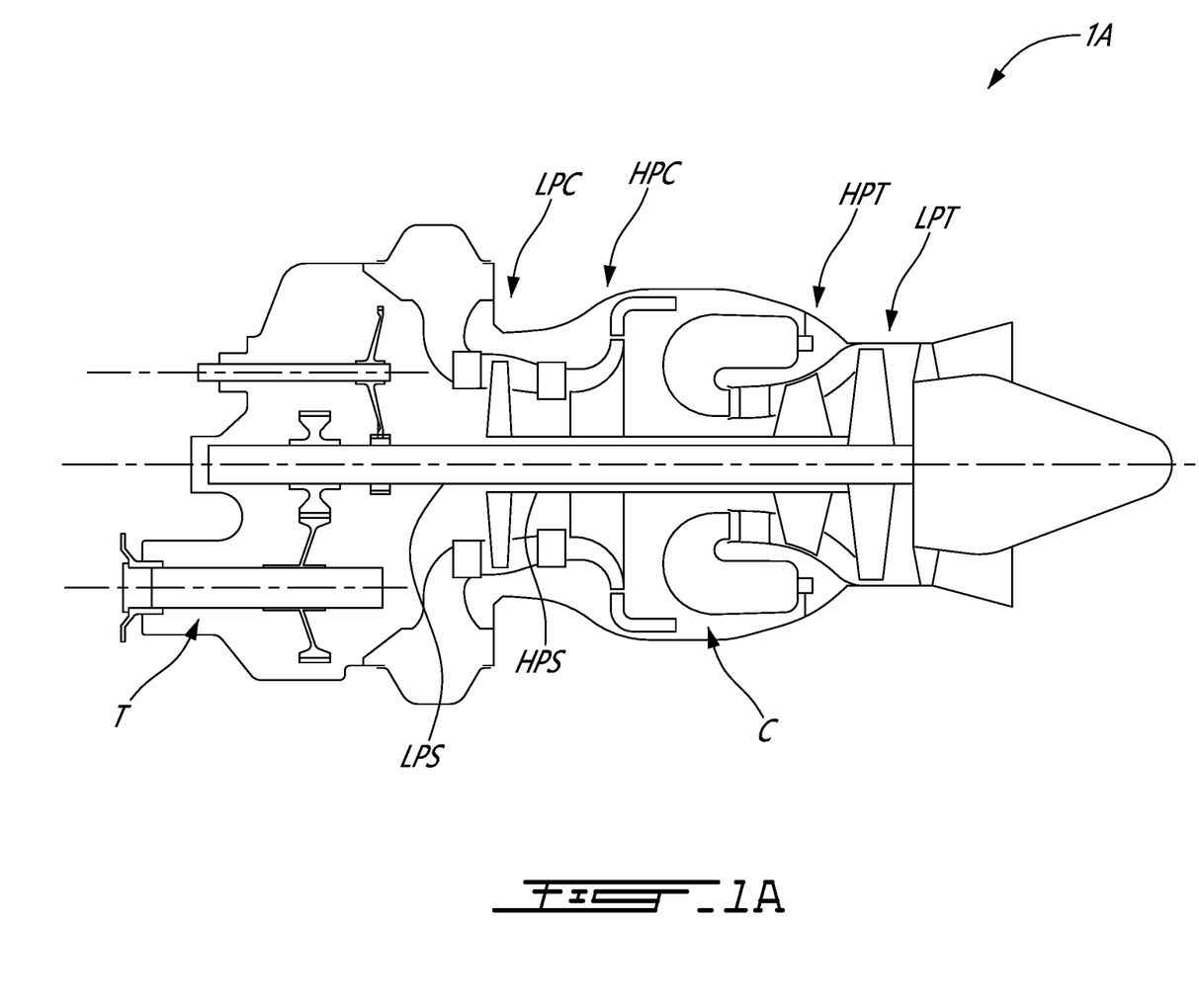
FIG. 1A is a schematic cross sectional view of an aircraft engine.

FIG. 1A illustrates an aircraft engine 1A, which may be part of an aircraft, such as a conventional aircraft for example. In this example, the engine 1A is a turboshaft engine 1A, but could be any other type of aircraft engine. In this embodiment, the engine 1A includes in serial flow communication a low pressure compressor section (LPC) and a high pressure compressor section (HPC) for pressurizing air, a combustor (C) in which the compressed air is mixed with fuel and ignited for generating an annular stream of hot combustion gases, a high pressure turbine section (HPT), and a lower pressure turbine section (LPT). The respective pairs of the compressor and turbine sections are interconnected via respective independently rotatable low pressure and high pressure spools (LPS), (HPS). The engine 1A includes a transmission (T) driven by the low pressure turbine section (LPT) for outputting motive power to an aircraft.

Figure 1B:
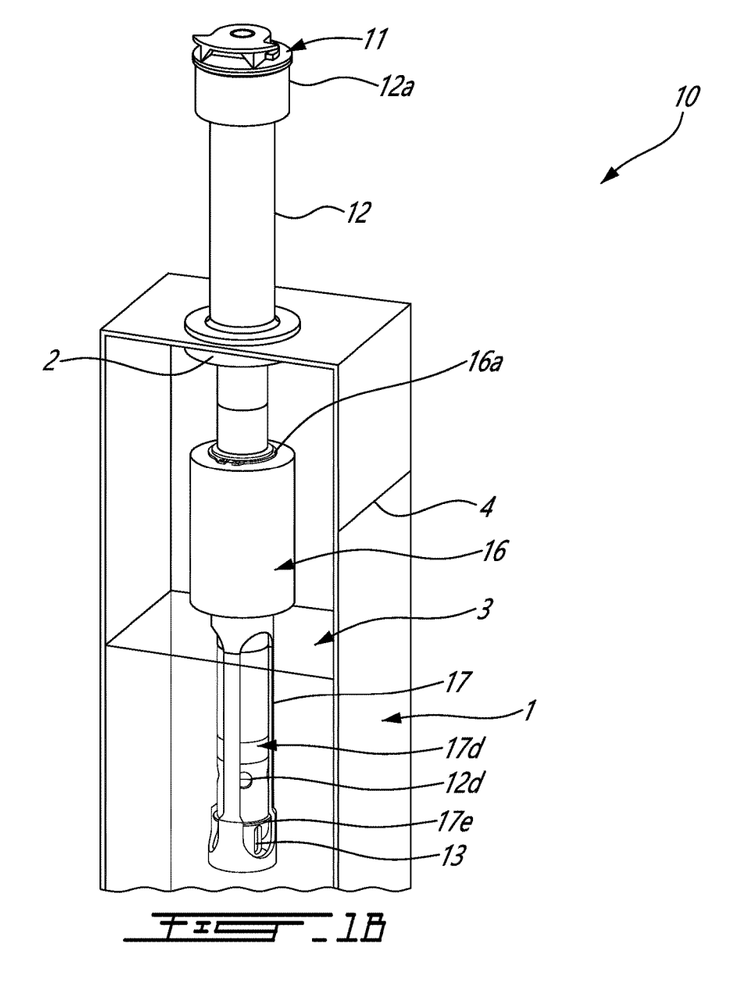
FIG. 1B is a schematic cross sectional view of an oil tank of the aircraft engine of FIG. 1A, showing an aircraft engine oil filler apparatus of the oil tank.

FIG. 1B illustrates an oil tank 1 of an aircraft engine, such as the turboshaft engine 1A. The oil tank 1 may be, for example, part of an oil system of the engine 1A and may be connected to the oil system via, for example, any conventional connectors. Accordingly, these aspects of the oil tank 1 and the oil system are not shown or described in detail. The oil system may be any oil system. Still referring to FIG. 1B, the oil tank 1 defines an opening 2. In the present embodiment, the opening 2 may be delimited by a cylindrical and threaded tube portion or wall, but may be of a different shape and/or construction. The opening 2 receives therethrough an aircraft engine oil filler apparatus 10. As described in detail below, in the illustrated embodiment, the aircraft engine oil filler apparatus 10 may allow oil 3 to be added into the oil tank 1, may prevent the oil tank 1 from being filled to above a threshold oil level 4, may prevent or at least reduces risk of spillage of oil 3 out of the oil tank 1 when the oil tank 1 is in use, and/or may allow a dipstick to be used to measure the level of oil 3 in the oil tank 1 at least while the oil level is below the threshold oil level 4. In other embodiments, the aircraft engine oil filler apparatus 10 may have a different set of functionalities.

Figure 2A:
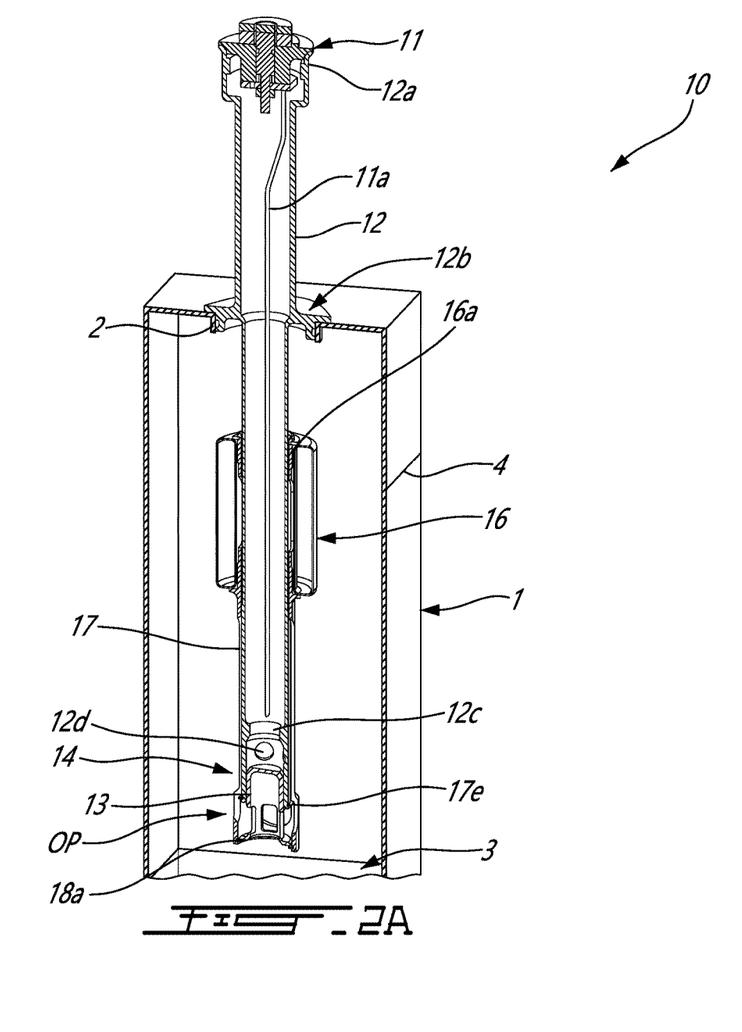
FIG. 2A is a schematic cross sectional view of the oil tank and the aircraft engine oil filler apparatus of FIG. 1B, with oil in the oil tank being at a first level and a valve of the aircraft engine oil filler apparatus being in an open position.

In the present embodiment, the aircraft engine oil filler apparatus 10 includes a cap 11 structured to removably attach to an open upper end 12a of a filler tube 12 to cover the upper open end 12a of the filler tube 12 when the oil tank 1 is in use, and to be removable from the filler tube 12 to allow for oil 3 to be added to the oil tank 1 via the filler tube 12. To this end, and as shown in FIGS. 1B and 2, the cap 11 includes a securement mechanism coupled to a lever on top of the cap 11. This structure allows the cap 11 to be received into or taken out of the open upper end 12a of the filler tube 12 while the lever is lifted. The lever may be manually pivoted to a closed position while the cap 11 is in the upper end 12a of the filler tube 12, such as shown in FIG. 1B for example, to cause the securement mechanism to removably secure the cap 11 in the open upper end 12a. The securement mechanism may be a conventional securement mechanism (i.e., not necessarily one with a lever), may be any other suitable securement mechanism, and is therefore not described in more detail herein. An example of other securement mechanism is threading.

Referring to FIG. 2A, in this embodiment, the cap 11 includes a dipstick 11a that is attached to a bottom of the cap 11. The dipstick 11a extends into the filler tube 12 when the cap 11 is removably attached to the upper open end 12a of the filler tube 12. A length of the dipstick 11a is selected to suit each particular embodiment of the oil tank 1 and its application, to allow a user to determine a level of oil in the oil tank 1. Moreover, the dipstick 11a may have graduated marks indicative of a level of oil. In other embodiments, the dipstick 11a may be detachable from the cap 11 and/or may be separate from the cap 11. In some such alternative embodiments, the filler tube 12 may define an additional aperture/opening in its upper end 12a, for receiving the dipstick 11a through that additional aperture/opening. In some cases, such an alternative construction may allow the dipstick 11a to remain inserted in the filler tube 12 while the cap 11 is removed from the filler tube 12 to allow for oil 3 or other substance to be poured into the filler tube 12.

Still referring to FIG. 2A, in the present embodiment, the filler tube 12 includes a flange 12b that is shaped to be mateably received into the opening 2 in the oil tank 1 to form a liquid-tight interface with the surface(s) of the fuel tank 1 defining the opening 2. As shown, in this embodiment, the flange 12b facilitates the insertion of the filler tube 12 into the opening 2 by preventing over-insertion into the opening 2 and keeps the filler tube 12 connected to the oil tank 1. In other embodiments, the filler tube 12 and/or the opening 2 may have different complementary shapes and/or may be structured for a different type of mating connection, such as a clip-in or a threaded connection for example. In yet other embodiments, the filler tube 12 and the oil tank 1 may be integral to each other.

When in place in the oil tank 1 as shown in FIG. 2A, the filler tube 12 extends into the oil tank 1, with part of the filler tube 12 remaining disposed outside of the oil tank 1. In other embodiments, the filler tube 12 may be structured to be disposed at least substantially in its entirety at or below an outer surface of the oil tank 1. In this embodiment, the length of the dipstick 11a is selected such that a bottom end of the dipstick 11a is disposed above a seat 12c that is disposed inside the filler tube 12. As described in more detail below, in the illustrated embodiment, the seat 12c allows for the filler tube 12 to be selectively hydraulically disconnected from the oil tank 1 to prevent overfill or spillage of oil should the cap 11 be mis-installed and a pressure differential existing between the air inside the oil tank 1 and the air outside the oil tank 1.

In the present embodiment, it is an inner surface of the filler tube 12 that defines the seat 12c in its bottom half, for instance by an integral rib. However, it is contemplated that the seat 12c may be a separate element coupled to the inside of the filler tube 12. The position of the seat 12c inside the filler tube 12 is selected to allow the cap 11 to be removably secured to the open upper end 12a of the filler tube 12 with the dipstick 11a being attached to the cap 11 and disposed in its entirety above the seat 12c, without being an interference for the dipstick 11a when the valve 14 (described below) is seated against the seat 12c. Stated otherwise, the position of the seat 12c inside the filler tube 12 is selected to be sufficiently low in the filler tube 12 so as to not interfere with the insertion of the dipstick 11a into the filler tube 12.

Still referring to FIG. 2A, below the seat 12c, the filler tube 12 defines one or more apertures 12d therein, and more particularly through a wall of the filler tube 12. In some embodiments, a single aperture 12d may be used. As described in more detail below, the apertures 12d allow for oil 3 poured into the open upper end 12a of the filler tube 12 while the cap 11 is removed to enter the oil tank 1. The apertures 12d may also allow an equalization of pressure between the ambient environment outside of the oil tank 1 and pressure inside the oil tank 1 while both of the following conditions are true: i) the cap 11 is removed from the upper open end 12a of the filler tube 12 (i.e. moved to open/unseal the upper open end 12a of the filler tube 12), and ii) the level of oil 3 inside the oil tank 1 is below the threshold oil level 4 (described in detail below).

As shown in FIGS. 2A to 5A, the filler tube 12 defines multiple apertures 12d circumferentially around the wall of the filler tube 12 in a single plane transverse to that part of the filler tube 12. However, it is contemplated that any other number and/or arrangement may be used, so long as the aperture(s) 12d is/are below the seat 12c and the functionality of the aircraft engine oil filler apparatus 10 as described herein is provided.

Figure 3:
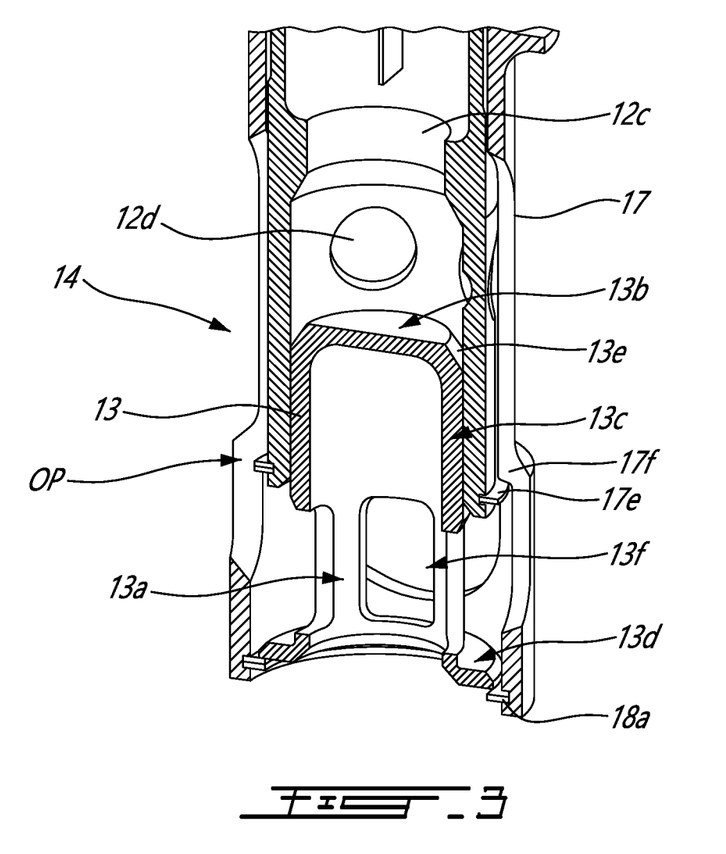
FIG. 3 is a close-up schematic cross sectional view of a part of the valve of the aircraft engine oil filler apparatus of FIG. 2A, the valve being in the open position.

Referring to FIGS. 2A and 3, in the present embodiment, the aircraft engine oil filler apparatus 10 includes a telescoping piston 13. The piston 13 has a body 13a defining a head 13b, a cylindrical sidewall 13c extending below the head 13b, and a flange 13d extending at an end of the body 13a opposite the head 13b. The head 13b includes a substantially flat circular disk disposed at an upper end of the body 13a of the piston 13. The head 13b could be shaped otherwise in other embodiments, such as a dome, a conical or a frusto-conical member. The body 13a further defines a taper 13e extending between the head 13b and the sidewall 13c. The flange 13d projects radially outwards and extends radially further than the head 13b, the taper 13e and the sidewall 13c. Apertures 13f are defined in the sidewall 13c for weight saving purposes. The apertures 13f could be shaped and dimensioned otherwise in other embodiments, or omitted entirely.

Referring to FIGS. 2A to 7, the piston 13 forms a valve 14 in the aircraft engine oil filler apparatus 10. The valve 14 is operable to provide one or more of, and in some embodiments all of, the following functions: a) to allow oil 3 to be added into the oil tank 1 via the aperture(s) 12d while the cap 11 is removed from the upper open end 12a of the filler tube 12 (i.e. moved to open/unseal the upper open end 12a of the filler tube 12) and while oil 3 inside the oil tank 1 is below the threshold oil level 4, b) while the oil tank 1 is being filled, for the rising oil level in the oil tank 1 to be at least approximately equal to the oil level inside the filler tube 12 after the oil 3 in the oil tank 1 reaches the filler tube 12 and at least until the oil 3 in the oil tank 1 reaches the threshold oil level 4, c) to hydraulically disconnect the filler tube 12 from the oil tank 1 by seating the head 13b of the piston 13 against the seat 12c, when the oil 3 in the oil tank 1 has reached the threshold oil level 4, and/or d) to hydraulically disconnect the filler tube 12 from the oil tank 1, by seating the head 13b of the piston 13 against the seat 12c in this embodiment, when pressure in the oil tank 1 is greater than in the filler tube 12, such as when the cap 11 is mis-installed or missing in operation for example, as shown in FIG. 5B.

The valve 14 may enable one or more of, and in some embodiments all of, the above functions while allowing the dipstick 11a to be inserted into the filler tube 12 independent of the position of the telescoping piston 13, for checking oil level inside the oil tank 1 by checking the oil level inside the filler tube 12. The telescoping piston 13 and the valve 14 are described in more detail next.

Referring to FIG. 2, the aircraft engine oil filler apparatus 10 includes at least one float 16 translationally connected to, and in this embodiment translationally received over, the filler tube 12 above the valve 14. The aircraft engine oil filler apparatus 10 also includes at least one link 17 that, at least in this embodiment, is/are translationally received over the filler tube 12. The link(s) 17 operatively connect(s) the valve 14 to the float 16. More particularly, and referring briefly back to FIG. 1B, in the present embodiment the float 16 and the links 17 define a central aperture 16a into which the filler tube 12 is received as shown in FIG. 1B. The central aperture 16a is sized, at least along a respective portion of its length for example, slightly larger than an outer diameter of the filler tube 12 to allow the float 16 and the links 17 to translate up or down relative to the filler tube 12. It is contemplated that a different construction providing for a translational joint between the filler tube 12 and the float 16 and links 17 may be used.

Figure 2B:
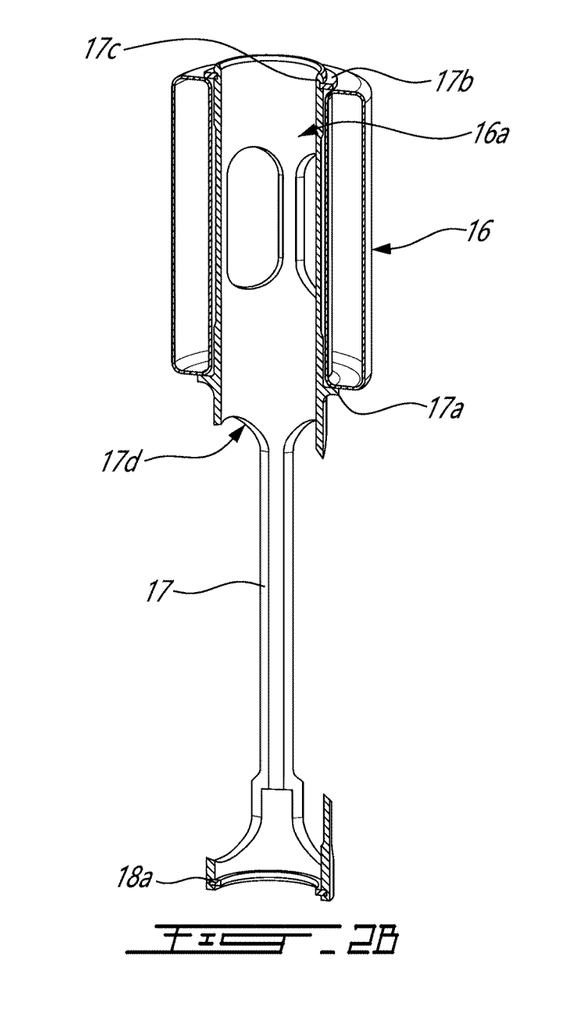
FIG. 2B is a cross sectional view of a float of the aircraft engine oil filler apparatus of FIG. 2A.

In this embodiment, the float 16 is made using suitable welding techniques and the links 17 are machined metallic parts, but they could be formed of polymeric material and manufactured by injection molding techniques. The float 16 and the links 17 are provided as separate parts being attached to each other, with the float 16 containing air that provides floatation as described herein. Referring to FIG. 2B, the links 17 are inserted in the central aperture 16a defined by the float 16. The links 17 define flange 17a on which the lower portion of the float 16 abuts. The float 16 is retained to the links 17 by a circular clip 17b connected to an upper portion of the links 17 and received in a recess 17c defined in the upper portion of the links 17. The circular clip 17b and the flange 17a thus keep the float 16 attached to the links 17. Apertures 17d (best seen in FIG. 1B) are also defined by the links 17 to allow oil 3 to flow therethrough, and for weight saving purposes. Put differently, when apertures 17d overlap at least partially apertures 12d, oil 3 can flow from the filler tube 12 through the apertures 17d and into the oil tank 1. In other embodiments, other constructions and/or materials (e.g., metal, composites) and/or manufacturing methods may be used. For example, the float 16 may be made from a material that floats in the oil 3, or other substance for which the tank 1 may be designed, to provide for the functionality as described in this document. As another example, the float 16 may be integral to the links 17. As another example, a different type of link(s) 17, such as length-adjustable links, may be used.

Referring to FIGS. 1B to 3, the links 17 are retained on the filler tube 12 by a stopper 17e. The stopper 17e, or ledge, is defined by a circle clip connected to the bottom portion of the filler tube 12 and received in a recess defined in the bottom portion of the filler tube 12. The stopper 17e could be formed otherwise in other embodiments. A shoulder 17f (FIG. 3) of the links 17 abuts the stopper 17e and prevents the links 17 from falling out of the bottom portion of the filler tube 12.

Referring to both FIGS. 2A and 3, in this embodiment, the valve 14 is translationally received in a bottom portion of the filler tube 12. As shown, the valve 14 has an open position (OP) in which the valve 14 hydraulically connects the filler tube 12, and more particularly in this embodiment the portion of the filler tube above the seat 12c, to the oil tank 1. To this end, in this embodiment, the valve 14 includes the piston 13. The piston 13 is translationally received in the bottom portion of filler tube 12. The head 13b of the piston 13 is below the aperture(s) 12d when the valve 14 is in the open position (OP) so as to hydraulically connect the filler tube 12 to the oil tank 1.

Referring to FIGS. 2A to 5A, the open position (OP) of the valve 14 is delimited by a circular clip 18a, or equivalent abutment, removably received in a corresponding circumferential recess defined in the inner surface of the links 17. The circular clip 18a serves as a stopper, or ledge, upon which the flange 13d of the piston 13 of the valve 14 abuts when in the open position (OP), and which prevents the piston 13 from moving down past the open position (OP) and thus prevents the piston 13 from falling out of the bottom portion of the filler tube 12. The circular clip 18a thus acts as a piston interface between the links 17 and the flange 13d of the piston 13. It is contemplated that any other stopper or ledge may be used to define the open position (OP) of the valve 14.

Figure 4:
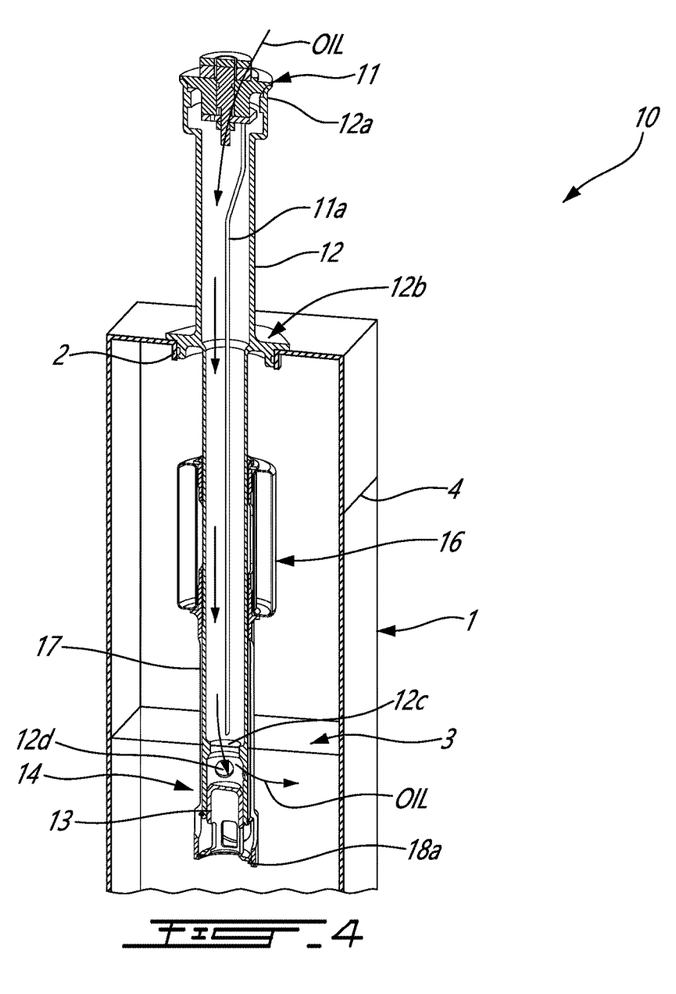
FIG. 4 is a schematic cross sectional view of the oil tank and the aircraft engine oil filler apparatus of FIG. 1B, with oil in the oil tank being at a second level and the valve being in the open position.
Figure 6:
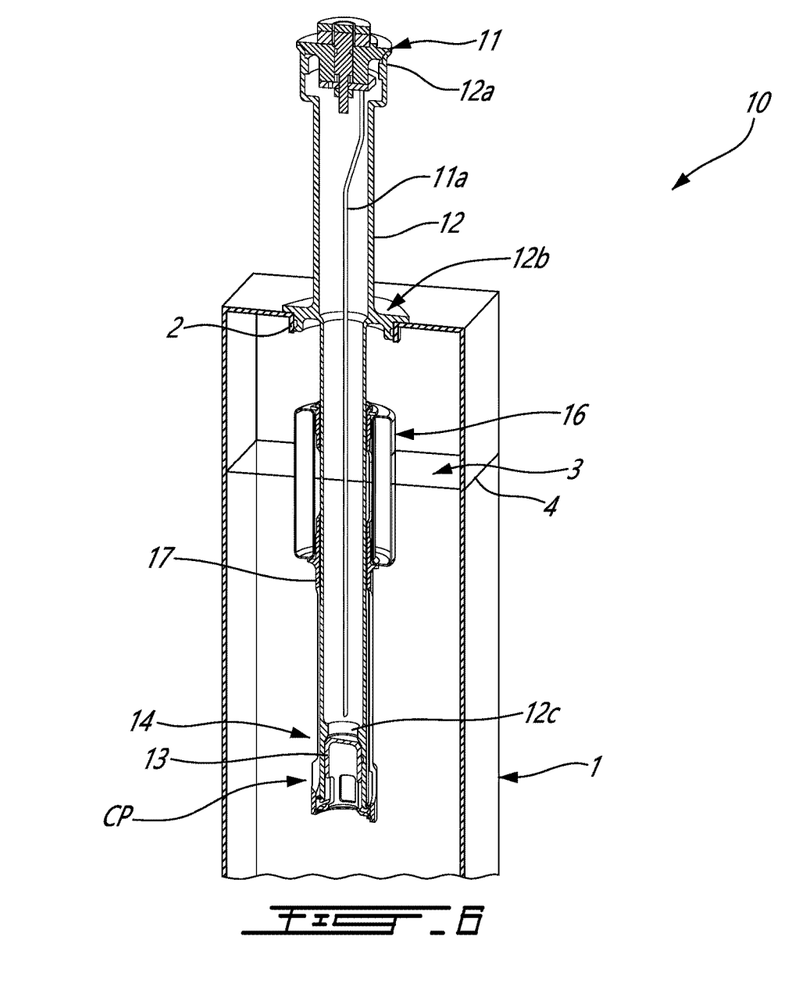
FIG. 6 is a schematic cross sectional view of the oil tank and the aircraft engine oil filler apparatus of FIG. 1B, with oil in the oil tank being at a fourth level and the valve being in a closed position.

As best shown in FIGS. 3, 4 and 6, the piston 13 is supported by the links 17 via the circular clip 18a and the flange 13d so that when the float 16 moves up relative to the filler tube 12, the links 17 apply a corresponding upward force to the piston 13 and thereby move the piston 13 from the open position (OP) upward toward the seat 12c. In this embodiment, the engagement between the piston 13 and the links 17 is provided via the circular clip 18a. In this embodiment, the piston 13 is not rigidly connected to the links 17. The piston 13 can move independently from the links 17 and the float 16. In an aspect, the decoupled relationship between the piston 13 and the links 17 helps provide the function d) described herein above, as will be described below.

As shown in FIGS. 2A to 5B, in the present embodiment, the piston 13 is sized such that when the valve 14 is in the open position (OP), the head 13b of the piston 13 is at least in part below at least one of the aperture(s) 12d and is disposed below the seat 12c. This position of the piston 13 does not impede the fluid communication between the filler tube 12 and the inside of the oil tank 1 via the open aperture(s) 12d. The fluid communication allows the filling and pressure equalization functions of the aircraft engine oil filler apparatus 10 as described herein.

More particularly, as shown in FIG. 4, the length of the piston 13, the size and floating characteristics of the float 16, and the length of the filler tube 12 and the link(s) 17 are selected relative to each other and relative to the dimensions of the oil tank 1 so that when the level of oil 3 in the oil tank 1 is below the threshold oil level 4, the valve 14 is in the open position (OP) and thus hydraulically connects the filler tube 12 to the inside of the oil tank 1. In this position, the cap 11 with the dipstick 11a may be removed from the filler tube 12, and oil 3 may be poured into the oil tank 1 via the upper open end 12a of the filler tube 12.

Figure 5A:
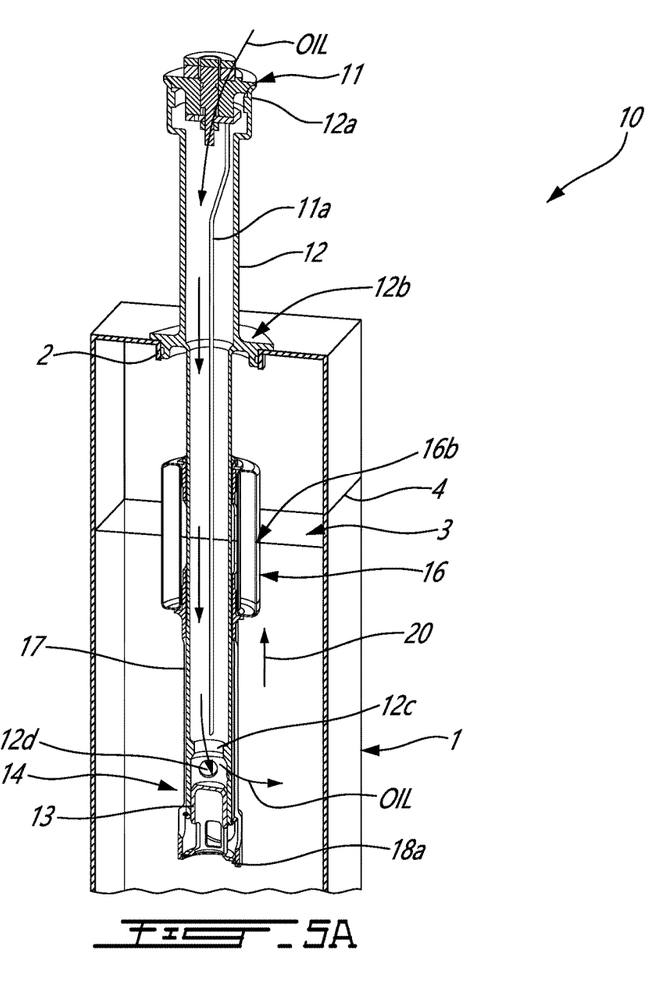
FIG. 5A is a schematic cross sectional view of the oil tank and the aircraft engine oil filler apparatus of FIG. 1B, with oil in the oil tank being at a third level and the valve being in the open position.

As shown with arrows OIL in FIGS. 4 and 5A, as oil 3 is being poured into the filler tube 12, the oil 3 flows through the filler tube 12 and into the oil tank 1 via the open aperture(s) 12d, with the valve 14 remaining at least approximately in its open position (OP). It should be noted that, while oil 3 is being poured in, some movement of the valve 14 relative to its open position (OP) without materially obstructing the aperture(s) 12d may occur, and may be acceptable.

As can be seen from FIGS. 4 and 5A, the fluid communication to the inside of the oil tank 1 provides a pressure-equalizing connection between the atmosphere and the inside of the oil tank 1. As a result, while the hydraulic connection exists, the level of oil 3 inside the oil tank 1 may be equal to the level of oil inside the filler tube 12. This effect, combined with the structure described above, allows a user to insert the dipstick 11a into the filler tube 12 and then take the dipstick out 11a to obtain an indication of the oil level inside the oil tank 1.

Now referring to FIG. 5A, as the oil 3 fills the oil tank 1 and reaches the level 16b on the float 16, the float 16 starts moving upward, as shown with arrow 20, with the rising level of oil 3. In other words, when the oil 3 is at the level 16b, the buoyancy force applied by the float 16 on the links 17 and the piston 13 equals the weight of the float 16, links 17 and piston 13. As the oil 3 keeps rising, the float 16 rises with the oil 3. The float 16 thereby starts correspondingly moving the valve 14 upward (as shown with arrow 20), with the rising level of oil 3. The float 16 continues moving up as long as oil 3 is being poured into the oil tank 1 until the piston 13 seats into/on the seat 12c. More particularly, and now referring to FIG. 6, when the oil 3 in the oil tank 1 reaches the threshold oil level 4, the valve 14 reaches a closed position (CP) in which the head 13b of the piston 13 and the taper 13e are pressed, by the upward buoyancy force transmitted from the float 16 to the piston 13 via the links 17, against and into the seat 12c above the apertures 12d.

Figure 5B:
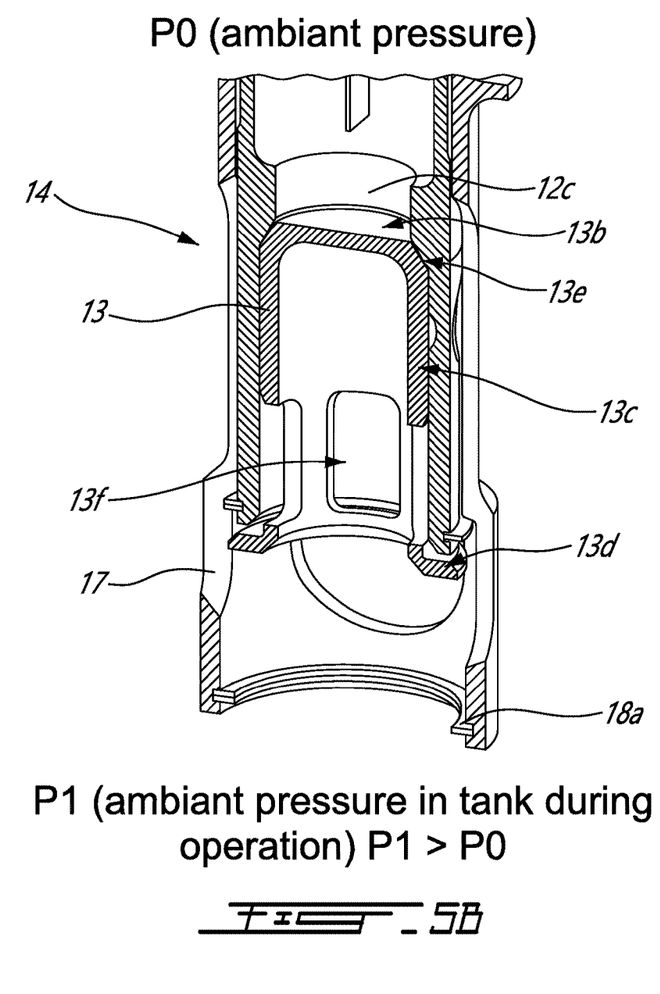
FIG. 5B is a close up, schematic cross sectional view of the part of the valve of the aircraft engine oil filler apparatus of FIG. 3, with pressure inside the oil tank being greater than pressure inside an upper empty portion of a filler tube of the aircraft engine oil filler apparatus.

More particularly, in the closed position (CP), the head 13b of the piston 13 and the taper 13e removably mate with/removably abut the seat 12c and hydraulically blocks the filler tube 12 at the seat 12c. In the closed position (CP), as best seen in FIG. 5B, the flange 13d remains spaced from the bottom portion of the filler tube 12 to make sure that the head 13b of the piston 13 and the taper 13e removably mate with/removably abut the seat 12c. The valve 14 thereby hydraulically disconnects the portion of the filler tube 12 above the seat 12c from the oil tank 1 and prevents any additional oil that may be added to the filler tube 12 above the seat 12c from flowing into the oil tank 1. It is contemplated that in some embodiments, the seat 12c may be omitted and the flange 13d may be shaped to conform to the inner diameter of the filler tube 12 at the bottom end thereof when in the closed position (CP), so as to hydraulically block the filler tube 12.

In such embodiments, and as shown in FIG. 2A for example, the length(s) of the filler tube 12 inside the oil tank 1 and/or of the piston 13 and/or of the link(s) 17 may be selected such that the piston 13 is below the apertures 12d when the valve 14 is in the open position (OP) to fluidly connect the portion of the filler tube 12 that is above the apertures 12d to the oil tank 1 via the apertures 12d.

In such embodiments, and as shown in FIG. 6 for example, the one or more length(s) described above may be selected such that the head 13b of the piston 13 is moved to a position above the apertures 12d when the valve 14 is moved to the closed position (CP), to hydraulically disconnect the portion of the filler tube 12 that is above the apertures 12d from the oil tank 1.

For simplicity, hydraulically disconnecting the relevant portion (whether the portion above the apertures 12d or the portion above the seat 12c) of the filler tube 12 from the oil tank 1 as described above in the different embodiments above is further referred to as "hydraulically disconnecting the filler tube 12 from the oil tank 1".

Also, because in the various embodiments described above the valve 14 may be operated upon movement of the float 16, the valve 14 may be referred to as a float valve. However, in this embodiment, the valve 14 (i.e. the piston 13) itself does not float in the oil 3 (i.e. it is made from material(s), such as any suitable conventional material(s), that is/are more dense than the oil 3).

Figure 7:
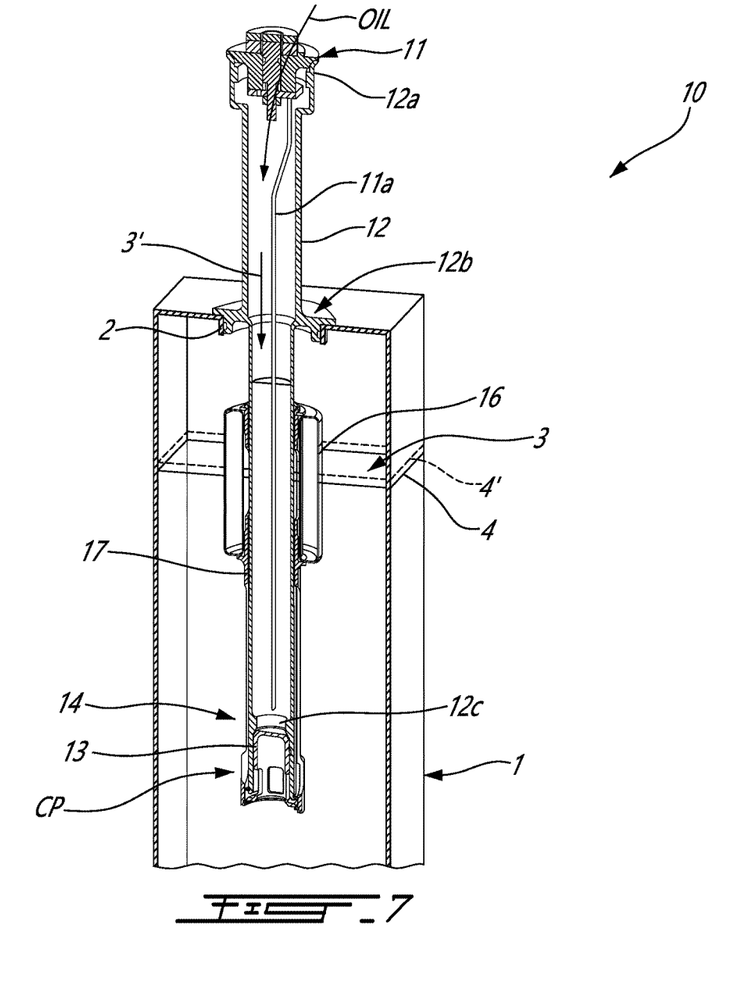
FIG. 7 is a schematic cross sectional view of the oil tank and the aircraft engine oil filler apparatus of FIG. 1B, with oil in the oil tank being the fourth level, with the valve being in the closed position, and with additional oil poured into the aircraft engine oil filler apparatus being contained inside the aircraft engine oil filler apparatus.

Referring to FIG. 7, the valve 14, by moving into the closed position (CP), prevents the oil tank 1 from being overfilled. Stated otherwise, the closed position (CP) of the valve 14 defines the threshold oil level 4 to which the oil tank 1 may be filled, and buoyancy of the float 16, links 17 and piston 13 is equal to the weight of these parts that are moving. When overfilling the filler tube 12, the buoyancy required to lift the float 16, links 17 and piston 13 is higher since it now equals the weight of these parts plus the weight of the oil tower that has accumulated in the filler tube 12 above the level 4 in the oil tank 1. Therefore, to reach that new required buoyancy, the float 16, links 17 and piston 13 move down, some oil flows into the oil tank 1, level in the oil tank 1 will rise to oil level 4' (shown in dashed line in FIG. 7), the float 16 will follow and go upward, and then move the piston 13 upward to close again the filler tube 12. The oil level 4' depends of how much the filler tube 12 is overfilled. In summary, some oil can flow into the oil tank 1 when overfilling the filler tube 12, but to a level (i.e. oil level 4') that is lower than the level in the filler tube 12. Also, it means that the dipstick 11a has an accurate reading of the oil level up to the threshold oil level 4, and that readings above level 4 is not necessarily the same in the oil tank 1, but could be between the threshold oil level 4 and the oil level 4', for example. If the oil tank 1 is flipped upside down, e.g., in flight, the valve 14 maintains the hydraulic disconnection/separation, by gravity instead of buoyancy.

The dimensioning of the parts of each particular embodiment of the filler tube 12, links 17 and piston 13 relative to each other and/or relative to the dimensions of each particular embodiment of oil tank 1 with which the aircraft engine oil filler apparatus 10 may be used, may be selected to pre-define the particular oil level 4 up to which each particular embodiment of oil tank 1 may be filled.

As a non-limiting example, a decrease in the length of the links 17 and/or an increase of the length of the portion of the filler tube 12 that is disposed inside the oil tank 1 may cause the the oil level 4 to be reduced. As another non-limiting example, the length of the links 17 may be increased and/or the portion of the filler tube 12 in the oil tank 1 may be decreased to increase the oil level 4 to which the oil tank 1 may be filled.

It is to be noted that the aircraft engine oil filler apparatus 10 described herein provides for all of the aforementioned functions a) to d), while reducing the number of parts needed to perform these functions compared to other aircraft engine oil filler apparatuses known in the art. This reduction in the number of parts may assist in reducing the mass of the aircraft engine oil filler apparatus 10, which may be beneficial at least in some circumstances. Furthermore, the aircraft engine oil filler apparatus 10 described herein provides for a piston 13 having a higher ratio of piston length over diameter of the head 13b of the piston 13 compared to other aircraft engine oil filler apparatuses including, for example, a ball and a piston in a filler tube having a similar length under the seat 12c. Having a higher ratio of piston length over diameter of the head 13b of the piston 13 reduces the likelihood of the piston 13 from jamming between the open position (OP) and the closed position (CP), which may be beneficial at least in some circumstances.

While the aircraft engine oil filler apparatus 10 of the present technology is illustrated as being used with the oil tank 1, the aircraft engine oil filler apparatus 10 of the present technology may also be used with a different type of vessel containing a liquid, such as with a fuel tank for example. In such a different application, the aircraft engine oil filler apparatus 10 may thus be used as an aircraft engine fuel filler apparatus 10. The oil tank 1 may therefore be any suitable oil tank, or any other suitable vessel, including a fuel tank. The oil (or other) tank 1 may be of any suitable construction, and may be a conventional tank and/or vessel needing to be filled with liquid from time to time.

The aircraft engine oil filler apparatus 10 of the present technology may be constructed using any combination of materials and using any manufacturing method that are suitable for each particular embodiment and application of the apparatus 10. For example, in the oil tank 1 application described above, the aircraft engine oil filler apparatus 10 may be injection molded out of plastic(s) that do/does not degrade as a result of contact with the oil 3 with which the oil tank 1 is to be filled.

Figure 8:
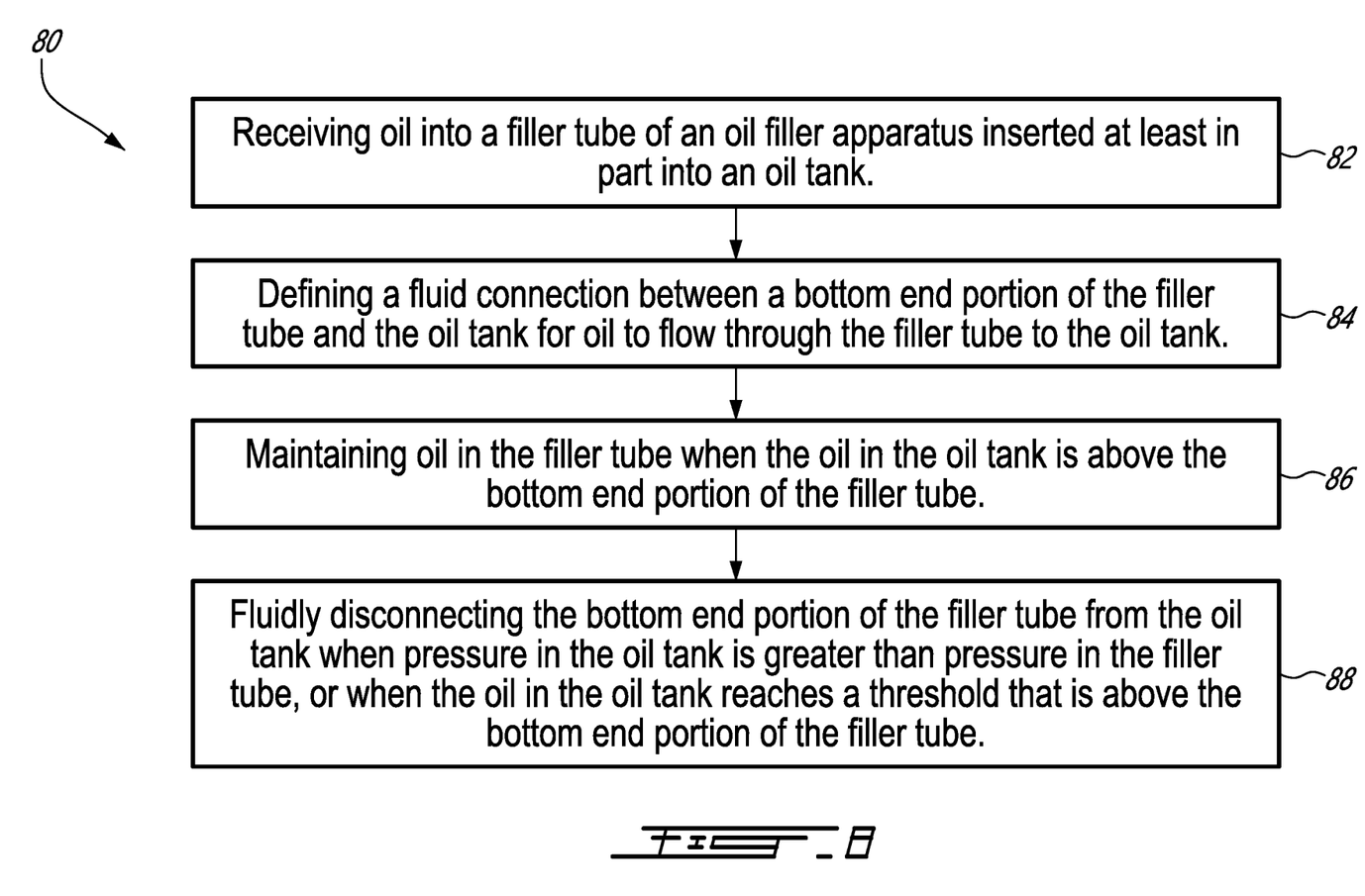
FIG. 8 is a diagram showing a method of operation of an oil filler apparatus.

With the above structure in mind, and now referring to FIG. 8, the present technology provides a method 80 of operation of an oil filler apparatus 10. As seen above, in some embodiments, the method 80 may include a step 82 of receiving oil into a filler tube 12 of the oil filler apparatus 10 inserted at least in part into an oil tank 1 of an aircraft. In some embodiments, the oil tank 1 may be a part of an engine 1A of the aircraft, while in other embodiments it may be a different oil tank. Also as seen with the structure above, in some embodiments the method 80 may also include a step 84 of defining a fluid connection, such as via one or more apertures 12d, between a bottom portion of the filler tube 12 and the oil tank 1 for oil 3 to flow through the filler tube 12 to the oil tank 1. The method 80 may also include a step 86 of maintaining oil 3 in the filler tube 12 when the oil 3 in the oil tank 1 is above the bottom end of the filler tube 12, such that a level of oil in the filler tube 12 is at least approximately equal to and rises together with a level of oil in the oil tank 1.

The method 80 may further include a step 88 of fluidly disconnecting the bottom portion of the filler tube 12 from the oil tank 1 when pressure in the oil tank 1 is greater than pressure in the filler tube 12, or when the oil 3 in the oil tank 1 reaches a threshold level that is above the bottom portion of the filler tube 12. For example, in some embodiments, the threshold level may be an established maximum desired oil level in a given oil tank 1 for a given one or more applications of the given oil tank 1. As seen above, in some embodiments, the fluidly disconnecting the bottom portion of the filler tube 12 from the oil tank 1 may include seating the piston 13 (and more particularly the head 13b and the taper 13e of the piston 13) against the seat 12c of the filler tube 12. In some embodiments, the seating the piston 13 may include translating the piston 13, such as translating the piston 13 into the seat 12c for example. In such embodiments, the seating the piston 13 may include blocking an inner diameter of the filler tube 12. Also as seen above, in such embodiments, the seating the piston 13 may include telescoping the piston 13 relative to the filler tube 12. In some such embodiments, the telescoping the piston 13 may include translating the piston 13 in the bottom portion of the filler tube 12.

As seen above, in some embodiments, the telescoping the piston 13 may include applying a buoyancy force, for example via the float 16, to the piston 13 to push the piston 13 upward. In some embodiments, the method 80 further includes receiving a dipstick 11a in the filler tube 12. As seen above, in some embodiments, the receiving the dipstick 11a occurs after the receiving oil 3 into the filler tube 12 but before the step 88 of fluidly disconnecting the bottom end of the filler tube 12 from the oil tank 1. Also as seen above, in some embodiments, the receiving the dipstick 11a occurs after the step 88 of fluidly disconnecting the bottom portion of the filler tube 12 from the oil tank 1. Yet further as seen above, in some embodiments, the method 80 also further includes receiving a cap 11 on the filler tube 12 and in some such embodiments the receiving the cap 11 includes receiving the dipstick 11a in the filler tube 12.

Yet further as seen above, in some embodiments, the method 80 may further include hydraulically disconnecting the filler tube 12 from the oil tank 1 when pressure in the oil tank 1 is greater than in the filler tube 12, such as may occur when the cap 11 is mis-installed or missing or otherwise compromised in operation for example. If and when the cap 11 is removed or otherwise compromised, as shown in FIG. 5B for example, the pressure in the filler tube 12 may drop to, for example, ambient pressure, which may be lower than pressure in the oil tank 1.

In at least some such cases, and depending on the pressure differential created, the pressure differential may cause oil 3, air and oil mist contained in the oil tank 1 to be pushed into the filler tube 12. This flow may move the piston 13 upward until the head 13b and the taper 13e of the piston 13 abut against the seat 12c and thereby hydraulically disconnect the filler tube 12 from the oil tank. Stated otherwise, the head 13b of the piston 13 may be sized such that when the pressure in the oil tank 1 becomes greater than the pressure in the upper empty portion of the filler tube 12, a flow of oil 3 may be induced and the flow may move the piston 13 against/into the seat 12c. Once the piston 13 is against the seat 12c, the piston 13 may be kept in the seat 12c by the pressure differential across the head 13b of the piston 13, such as until for example the pressure differential is removed.

The dimensioning of the parts of each particular embodiment of the filler tube 12, links 17, piston 13 and the head 13b relative to each other and/or relative to the dimensions of each particular embodiment of oil tank 1 with which the aircraft engine oil filler apparatus 10 may be used, may be selected based on the particular pressure differential that is required for the piston 13 to be pushed upward against/into the seat 12c. For example, should the mass of the piston 13 be decreased and the surface of the head 13b of the piston 13 be increased, then a lower pressure differential would be required to move the piston 13 upward.

The above description is meant to be exemplary only, and one skilled in the art will recognize that changes may be made to the embodiments described without departing from the scope of the technology disclosed herein. For example, the link(s) 17 may be structured, using any suitable construction for example, to be selectively adjustable in length, to allow for the oil level 4 in the oil tank 1 to be adjustable simply by adjusting the length of the link(s) 17. As another example, multiple floats 16 may be used to provide for the functionality described herein.

Still other modifications which fall within the scope of the present technology will be apparent to those skilled in the art, in light of a review of this disclosure, and such modifications are intended to fall within the appended claims.

The invention claimed is:

1. An aircraft engine oil filler apparatus, comprising:
a filler tube configured to be received through a wall of an oil tank of an aircraft engine such that an open upper end of the filler tube is accessible from outside of the oil tank and a bottom end of the filler tube is disposed inside the oil tank;
a valve received at least in part in the bottom end of the filler tube and movable between an open position in which the valve hydraulically connects the filler tube to the oil tank, and a closed position in which the valve hydraulically disconnects the filler tube from the oil tank; and
a float disposed above the valve and operatively connected to the valve to move the valve from the open position to the closed position when oil inside the oil tank rises to a threshold oil level defined by the closed position of the valve, the valve including a piston translationally received in the filler tube and being movable independently from the float for moving the valve from the open position to the closed position when pressure in the oil tank is greater than pressure in the filler tube and when oil inside the oil tanks is lower than the threshold oil level.

2. The aircraft engine oil filler apparatus of claim 1, comprising a link connecting the float to the valve.

3. The aircraft engine oil filler apparatus of claim 2, wherein the piston is supported by the link to translate relative to the filler tube with the float.

4. The aircraft engine oil filler apparatus of claim 3, wherein the filler tube defines an aperture in the filler tube below the float, and the piston includes a head disposed below the aperture when the valve is in the open position.

5. The aircraft engine oil filler apparatus of claim 4, comprising a seat disposed inside the filler tube above the aperture, and the head of the piston is received in the seat and thereby blocks the filler tube above the aperture when the valve is in the closed position.

6. The aircraft engine oil filler apparatus of claim 3, further comprising a stopper provided on the link, and wherein the piston includes a flange abutting the stopper when the valve is in the open position.

7. The aircraft engine oil filler apparatus of claim 6, wherein the flange of the piston remains spaced from the filler tube when the valve is in the closed position.

8. An oil tank of an aircraft engine, comprising:
a filler tube received through a wall of the oil tank such that an upper end of the filler tube is accessible from outside of the oil tank and a bottom portion of the filler tube is disposed inside the oil tank, the filler tube defining apertures in the bottom portion;

a valve received at least in part in the bottom portion of the filler tube, the valve being operable between an open position in which the valve hydraulically connects a portion of the filler tube above the apertures to the inside of the oil tank, and a closed position in which the valve blocks the filler tube above the apertures and thereby hydraulically disconnects the portion of the filler tube above the apertures from the inside of the oil tank; and a float disposed inside the oil tank above the valve and operatively connected to the valve to move the valve from the open position to the closed position when oil inside the oil tank rises to a threshold oil level defined by the closed position of the valve, the valve including a piston translationally received in the filer tube and being movable independently from the float for moving the valve from the open position to the closed position when pressure in the oil tank is greater than pressure in the filler tube and when oil inside the oil tanks is lower than the threshold oil level.

9. The oil tank of claim 8, wherein the piston has a head, the head of the piston is at least partially disposed below the apertures when the valve is in the open position and above the apertures when the valve in the closed position.

10. The oil tank of claim 9, comprising a dipstick removably received in the filler tube such that a bottom end of the dipstick is above the piston both when the valve is in the open position and when the valve is in the closed position.

* * * * *